United States Patent
Arlitt et al.

(10) Patent No.: US 8,674,535 B2
(45) Date of Patent: Mar. 18, 2014

(54) METHOD FOR POWER REGULATION OF AN UNDERWATER POWER PLANT

(71) Applicant: Voith Patent GmbH, Heidenheim (DE)

(72) Inventors: Raphael Arlitt, Ulm (DE); Michael Holle, Sohnstetten (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/851,851

(22) Filed: Mar. 27, 2013

(65) Prior Publication Data

US 2013/0214533 A1  Aug. 22, 2013

Related U.S. Application Data

(62) Division of application No. 12/589,301, filed on Oct. 21, 2009, now abandoned.

(30) Foreign Application Priority Data

Oct. 29, 2008 (DE) .......... 10 2008 053 732

(51) Int. Cl.
  *F03B 13/00* (2006.01)
(52) U.S. Cl.
  USPC .............................. 290/43; 290/54
(58) Field of Classification Search
  USPC ......................... 290/43, 44, 54, 55
  See application file for complete search history.

(56) References Cited

U.S. PATENT DOCUMENTS

| | | | | |
|---|---|---|---|---|
| 6,104,097 A * | 8/2000 | Lehoczky | ............ | 290/54 |
| 7,077,072 B2 * | 7/2006 | Wingett et al. | ............ | 114/312 |
| 7,307,356 B2 * | 12/2007 | Fraenkel | ............ | 290/54 |
| 7,649,275 B2 * | 1/2010 | Janca et al. | ............ | 290/43 |
| 7,795,750 B2 * | 9/2010 | Perner et al. | ............ | 290/54 |
| 7,936,077 B2 * | 5/2011 | Lehoczky | ............ | 290/43 |
| 7,948,109 B2 * | 5/2011 | Gray | ............ | 290/54 |
| 8,147,195 B2 * | 4/2012 | Vigars | ............ | 416/9 |
| 8,303,241 B2 * | 11/2012 | Corren et al. | ............ | 415/3.1 |
| 2003/0218338 A1 | 11/2003 | O'Sullivan | | |
| 2005/0012339 A1 | 1/2005 | Mikhail | | |
| 2010/0109325 A1* | 5/2010 | Hupe et al. | ............ | 290/31 |

FOREIGN PATENT DOCUMENTS

| | | |
|---|---|---|
| DE | 3601 289 | 7/1987 |
| EP | 0 739 087 | 10/1996 |

OTHER PUBLICATIONS

European Office Action dated Jul. 16, 2013 for European Patent Application 09013190.5.

* cited by examiner

*Primary Examiner* — Nicholas Ponomarenko
(74) *Attorney, Agent, or Firm* — Farjami & Farjami LLP

(57) ABSTRACT

The invention concerns a method for the operation of an underwater power plant with
  a water turbine to take up kinetic energy from a surrounding flow; and
  an electrical generator coupled directly to the water turbine;
characterized in that
  the power regulation in the generator mode is done by a control or regulation of the load moment produced by the electrical generator for a freely adjusting rpm speed of the water turbine,
  wherein the setpoint value of the load moment in a first, power-optimized operating range is established by a state controller and/or a search mechanism for the power maximum; and
  in a second, power-limited operating range the assigned load moment is chosen so that an operating point distant from the power optimum results for the water turbine.

15 Claims, 2 Drawing Sheets

METHOD FOR POWER REGULATION OF AN UNDERWATER POWER PLANT

This is a Divisional Application of U.S. patent application Ser. No. 12/589,301, filed Oct. 21, 2009, which is a U.S. national phase application, which is based on, and claims priority from foreign application Serial No. DE 10200805373202, filed Oct. 29, 2008, in Germany.

BACKGROUND

The invention concerns a method and a device for the power regulation of an underwater power plant with the features in the preamble of the independent claims.

Underwater power plants, which are free-standing in a surrounding flow and take up kinetic energy through a turbine to drive a directly coupled electric generator, are known and serve in particular to utilize tidal currents for production of electric energy. Usually a propeller-shaped water turbine, supported by a floating load-bearing structure or one placed on a foundation, is used to take up kinetic energy from the surrounding flow. For a simple design of such an underwater power plant, the water turbine is coupled directly to a gearing to convert the revolutions of the turbine into velocity. In both cases, there is a proportionality between the rotational speed of the water turbine and the number of revolutions of the electric generator, so that the revolutions of the water turbine, can be controlled by means or the electric generator.

For the power regulation of such an underwater power plant, the installed power must be maximized for slow to medium flow velocity. In one economical design of the plant, the power is limited above a given rated power.

Based on the above indicated regulation requirements, thus far a characteristic curve method of control has been used for a power-optimized plant operation, which starts with a measuring of the characteristic curve of the plant and assigns an optimal high-speed number to a particular flow velocity for which an optimal power coefficient and thus a maximum mechanical power uptake exists. This type of control system is contingent upon a sufficiently accurate measurement of the oncoming flow characteristic, besides the characteristic curve of the plant, taken as known. This requires a separate measurement system for the flow velocity, which is a system component burdened with a certain likelihood of malfunction. Furthermore, a measurement of the oncoming flow acting on the water turbine is problematical, due to local flow differences. Moreover, one must consider that the flow measurement system, while needing to be placed sufficiently close to the water turbine in order to receive the same flow as the water turbine, also needs to maintain such distance from the water turbine that the flow around the latter does not significantly affect the measurement of the field of flow.

A further drawback to a method based on characteristic curves is that, in the course of the aging of the plant, for example, due to algal growth or wearing of mechanical components, especially the bearing of the revolving unit, a deviation can occur from the originally measured characteristic curves forming the foundation of the control system.

To remedy the aforementioned problems, a refinement of a characteristic-based assigning of nominal rpm values for water turbines by a search algorithm for the power optimum has been proposed for hydraulically operated machine sets. We refer to DE 3601289 A1 and EP 0230636 B1 for this. To find the power maximum, a time variation for the manipulated variable is switched onto the speed control and the resulting power fluctuations are analyzed. Incremental correction values are switched into the nominal speed value consecutively so that an optimal effective power is put out to an electricity network by the machine set. Such a regulator is known as a maximum power point regulator (MPP regulator).

The drawback to the use of a MPP regulator for speed control is that fluctuations in the oncoming flow velocity in particular become superimposed as a perturbation on the systematically caused power variations of the search process that the power optimization is impaired. Moreover, when oncoming flow conditions are fluctuating heavily, which can occur at a tidal power plant during rough seas and turbulence in the current, the speed control is a detriment to the power regulation, since the adapting of the rpms and power often is not fast enough, and therefore the underwater power plant is subjected to a high torque input, which can only partly be used for producing electric energy.

A blade angle adjustment can be done to change the characteristic curve of the plant in order to accomplish the power regulation subject to a limiting of the power input. If, instead, the rotor blades of the water turbine are provided with a fixed installation angle, for the power-limited operating range one can slow down or speed up the water turbine to approach a working point outside of the power optimum. Sufficiently precise determination of the actual flow onto the water turbine is especially critical for this power-limited operating range.

SUMMARY

The basic problem of the invention is to indicate a power regulation for an underwater power plant that overcomes the above explained problems. A robust regulation method is needed, one which ensures safe plant guidance. At the same time, the regulation should be dynamic enough to efficiently convert a flow with high velocity fluctuation into electric energy. Moreover, the device of the invention should lead to a system that enables an operation without external sensors. In particular, the measurement of the flow characteristic on the water turbine should not be a prerequisite for the regulation method. Moreover, a secure starting and stopping of the underwater power plant should be given.

The basic problem of the invention is solved by the features of the independent claims. The inventors have learned that a sensor-free regulation based on a moment control can be used for the power-optimized operation of an underwater power plant of this kind, implemented by setting the load moment produced by the electrical generator. The rpm of the water turbine is not a setpoint. This is adjusted freely as a function of the inertia of masses of the revolving plant components and the hydrodynamic moments and braking moments acting on the plant and the load moment setpoint at the electrical side of the plant.

A state controller can be used to establish the setpoint for the load moment on the electrical generator. For one preferred embodiment, thanks to the use of observers and on the basis of a model of the controlled system it is possible to do without external sensors and use only the starting variables at the generator side to determine the state. If external sensors are nevertheless provided to ascertain the state variables, one has the option of correcting measured values by means of a disturbance variables model and further improve the regulation by a disturbance variables feedforward. Alternatively, one uses a search mechanism for the power maximum, an MPP regulator being preferred for this purpose, which puts out the setpoint assigned to the load moment at the electrical generator with a time variation in order to determine a power-optimized setpoint from the resulting fluctuations in the generator power. For this, the load moment can be varied in discrete incremental steps in time, or there can be a continuous variation. In particular, an oscillating load moment modulated with a slow frequency is conceivable.

Thanks to setting the load moment of the electrical generator, a change in the hydrodynamic moment taken up on the water turbine caused by a fluctuation in the oncoming flow can initially be absorbed by changing the rotational speed of the rotating masses, until the tracking to a new working point is accomplished by means of the MPP regulator. This provides a dynamic power regulation and, at the same time, a soft system behavior, cushioning any abrupt moments.

Furthermore, the regulation based on the load moment of the electrical generator can be used advantageously tot a second, power-limited operating range when high flow velocities arc present at the water turbine. For this, the load moment is set so that the water turbine is guided to a working point at a distance from the power optimum. It is conceivable to slow down the water turbine until flow breakaway occurs. Preferably, however, the water turbine will be guided to the high-speed range above the power-optimal rpm for the power limitation. Especially preferred, the plant will be regulated down to an essentially constant rated power. One can assign a definite load moment on the electrical generator to each hydraulic power taken up by the water turbine, and preferably the regulating of the power limitation is done by means of an MPP regulator.

BRIEF DESCRIPTION OF THE DRAWINGS

The invention will be explained more precisely hereafter by means of preferred sample embodiments and in conjunction with graphic representations. These show, in particular:

FIG. 1 shows one possible configuration of an underwater power plant 1 of this kind with a device according to the invention for the power regulation. The underwater power plant 1 comprises a water turbine 2 and an electrical generator 3, which in the present case is coupled directly to the water turbine 2 and thus can turn rigidly along with it.

DETAILED DESCRIPTION

Figure 1:
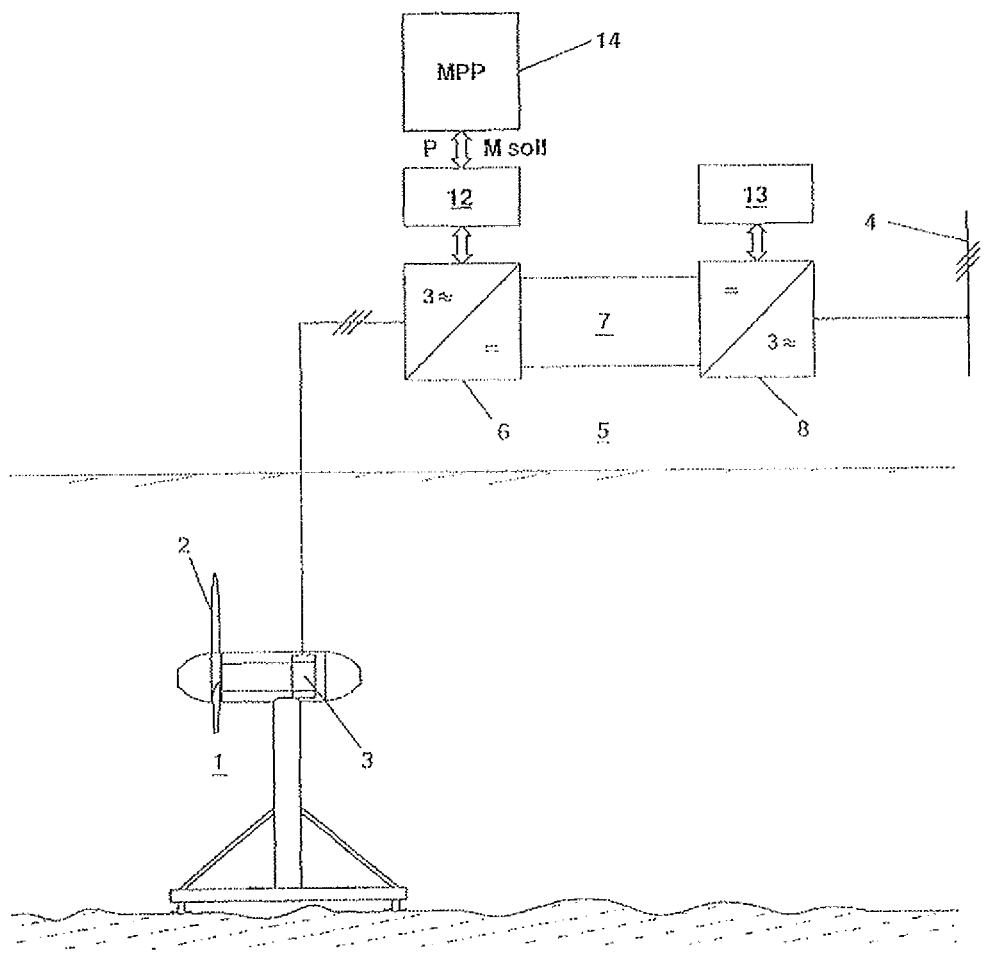
FIG. 1 shows, schematically simplified, a power regulation device according to the invention.

For feeding the electric power produced by the electrical generator 3 into an interconnected grid 4 with constant mains frequency, a frequency converter 5 is used, which in the present case comprises a converter 6 at the generator side, an intermediate d.c. voltage circuit 7 and a converter 8 at the grid side. For the configuration shown, a first regulator 12 is provided to regulate the frequency converter 5, being assigned to the converter 6 at the generator side, as well as a second regulator 13 for the converter at the grid side. In the most simple case, the two regulators work independently of each other, the first regulator 12 setting the load moment on the electrical generator 3 for the converter 6 at the generator side and the second regulator 13 stabilizing the voltage in the intermediate d.c. voltage circuit 7 for the converter 8 at the grid side. The first regulator 12 and the second regulator 13 are typically integrated in the respective converter 6, 8.

The search mechanism for the power maximum 14, in the sample embodiment an MPP regulator, determines from the power data P of the electrical generator 3 present at the first regulator 12 for the converter 6 at the generator side a setpoint value for the load moment Msoll and feeds this back to the first regulator 12, the setpoint being variable in tune. Based on the setpoint value for the load moment Msoll, the converter 6 at the generator side regulates and/or controls the load current at the electrical generator 3 of the underwater power plant. If a synchronous machine excited by permanent magnet is used as the electrical generator 3, the load current and consequently the load moment can be adjusted by a regulation or control of the stator voltage components d, q in the 2-axis system of the synchronous machine.

Figure 2:
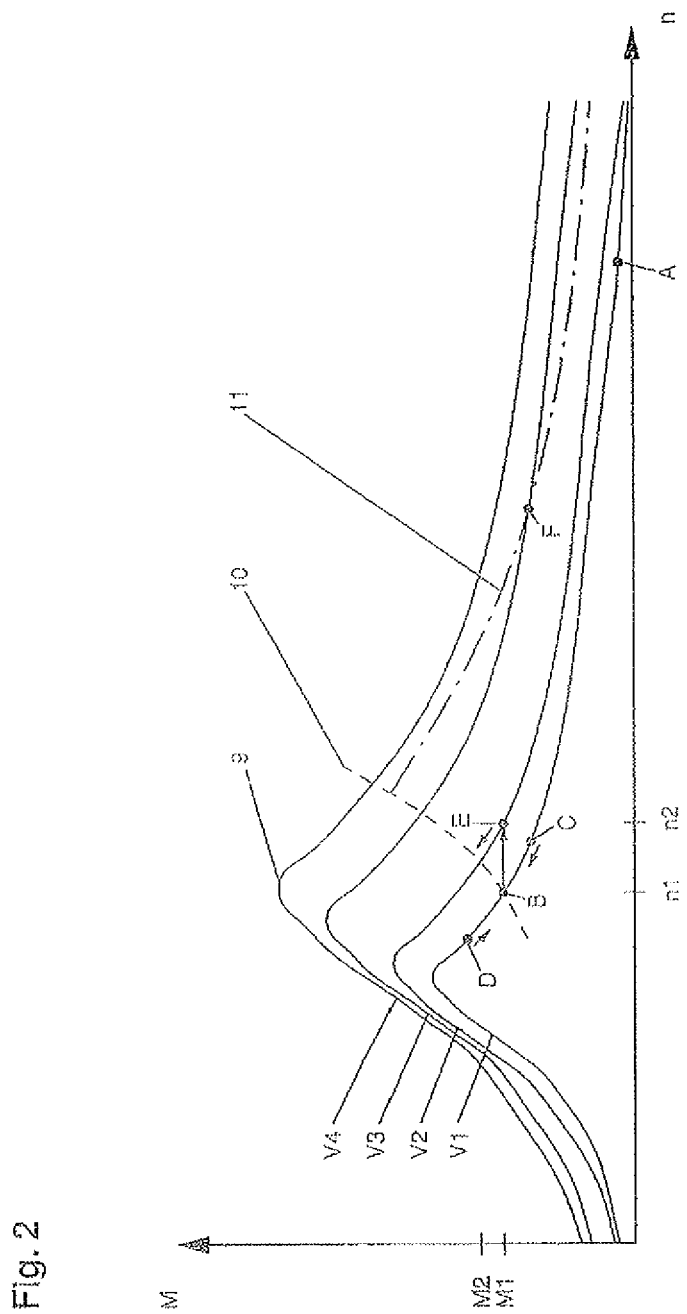
FIG. 2 illustrates the method of the invention using turbine moment characteristic curves.

By means of FIG. 2, the setting of the power-optimized load moment by the MPP regulator can be explained. Shown as a sketch and schematically simplified is a family of characteristic curves parameterized with the flow velocities V1-V4, representing the relation between the hydraulic moment M taken up by the water turbine 2 and the rpm n of the water turbine. The broken line shows the position of the power-optimal torque 10, which is shifted toward higher rpm as compared to the maxima of the hydrodynamic, moment 9.

For the flow relations coordinated with the characteristic V1, the power optimum occurs at working point B, which is coordinated with the moment M1. In order to find this working point B, the MPP regulator at first sets a first setpoint for the load moment Msoll, being chosen too low in the present instance, so that alter the dynamic effects die away the water turbine reaches the working point C, which is shifted toward the high-speed range as compared to the power-optimal working point B. Varying the setpoint for the load moment Msoll then leads to a system response to the electric power put out by the electrical generator 2, so that a correlated power gradient can be determined as a function of the load moment and the MPP regulator brings about an incremental adaptation of the load moment at the electrical generator 2 until the power-optimal working point B is reached. The same holds, with opposite sign, for the working point D, for which the MPP regulator first sets a load moment which is too high compared to the power-optimal value, and this is consecutively reduced until reaching working point B.

Moreover, one notices from FIG. 2 the case when a rise in the flow velocity at the water turbine occurs. An arrow shows the transition from the characteristic curve V1 to V2 from working point B to working point E. This occurs under the assumption that so initially an unchanged load moment M1 is produced by the electrical generator 3. The hydrodynamic moment taken up by the water turbine 2 at speed n1 will then exceed the load moment in the beginning, so that the rotating unit is accelerated until a new equilibrium of momentum is reached at speed n2. Starting from working point E, the MPP regulator will then put out a setpoint for the load moment that increases over the course of time, so that a new power-optimal working point is found. The search direction is indicated in FIG. 2 by an arrow, pointing to the power-optimal torque 10. The power regulation is done in the first, power-optimized operating range at turbine speeds that are larger than the speeds coordinated with the maximum turbine moment 9.

For an advantageous design, the method according to the invention and the device to according to the invention includes an option for monitoring the power generation, in order to safely prevent the applying of a load moment to the water turbine in excess of the overturning moment. The sum of the braking moments should not exceed the maximum torque for the particular flow velocity in this case. But if such should occur for a short time, it must be immediately counteracted by abruptly lowering the load moment at the electrical generator 3 in order to ensure high-speed operation of the wafer turbine 2 once again.

In order to ensure the power regulation in the aforementioned speed range with the speed otherwise being freely adjusting, the method of the invention composes the following steps to activate the underwater power plant 1 from standstill or idling operation. At first, a startup phase is run through, in which the water turbine 2 is run up to speed and accelerated as far as the high-speed range. For this, FIG. 2 shows the working point A as an example. Advantageously for this, the water turbine 2 is first propelled by the electrical generator 3 operating in motor mode and only above a particular speed gradient is high-speed operation achieved exclusively by the hydrodynamic moment taken up by the water turbine 2. Preferably, the high-speed operation of the water turbine 2 is done long enough so that the speed gradient drops below a threshold value before the startup phase is ended and the transition to the first, power-optimized operating range occurs. In this way, the water turbine 2 can be driven near the runaway speed, and the turbine speed so achieved can be used to infer the propelling flow velocity. Accordingly, a first estimated value for the power-optimal load moment can be established for the then activated MPP regulator, which brakes the water turbine 2 by applying a generator load and moves to the power-optimal working point.

Furthermore, the dot and dash line in FIG. 2 shows the load moment for regulation that is set in the second, power-limited operating range. The switching between the operating ranges occurs upon reaching the plant's rated power. Therefore, the load moment at the electrical generator is preferably reduced. As an example of this FIG. 2 shows the working point F. Accordingly, the rotating unit of the underwater power plant 1 is accelerated until the water turbine 2 in the high-speed range takes up a reduced hydrodynamic moment, which creates a moment equilibrium, for the imposed load moment.

Moreover, according to one advantageous embodiment of the invention, it is possible to monitor a flow that is too low to be used efficiently for production of electric energy. For this case, the plant is shut down, especially to spare the beating components of the underwater power plant 1. For this, the load moment is increased to beyond the overturning moment of the water turbine 2.

Further configurations of the invention are conceivable. In particular, the load moment at the electrical generator 3 can be adjusted in various ways. Moreover, it is possible, at least for a short time, to slow down the water turbine 2 by an excess moment, say, in order to chive as quickly as possible to the power-optimal operating point after starting the plant.

List of Reference Symbols 1 underwater power plant
2 water turbine
3 electrical generator
4 interconnected grid
5 frequency converter
6 converter at generator side
7 intermediate d.c. voltage circuit
8 converter at grid side
9 maximum turbine moment
10 power-optimal torque
11 load moment for regulation
12 first regulator
13 second regulator
14 search mechanism for the power maximum

The invention claimed is:

1. A method for operating an underwater power plant, the power plant including a water turbine to take up kinetic energy from a surrounding flow, and an electrical generator coupled directly to the water turbine, the method comprising:
regulating power in a generator mode by at least one of a feedback control and a feedback regulation of a load moment produced by the electrical generator for freely adjusting rpm speed of the water turbine;
wherein a setpoint value of the load moment produced by the electrical generator in a first, power-optimized operating range is established by at least one of a feedback control based on state space representation and a search mechanism for a maximum power taken up by the water turbine from the surrounding flow to operate the water turbine with power-optimal speed;
wherein the setpoint value of the load moment produced by the electrical generator in a second, power-limited operating range is set so the rpm speed of the water turbine is above the power-optimal speed;
wherein switching occurs from the first, power-optimized operating range to the second, power-limited operating range when the power taken up by the water turbine from the surrounding flow reaches a rated power of the underwater power plant.

2. The method according to claim 1, wherein the search mechanism for the power maximum comprises an MPP regulator, the MPP regulator determines a time-variable setpoint value for the load moment to maximize the output power of the electrical generator.

3. The method according to claim 1, wherein a working point in the second, power-limited operating range lies above the power-optimal speed.

4. The method according to claim 1, wherein a synchronous machine excited by permanent magnet is used as the electrical generator and the load moment is brought about by at least one of a regulation and a control of a stator voltage in a 2-axis system of the synchronous machine.

5. The method according to claim 1, wherein a frequency converter is coordinated with the electrical generator to feed electric power into an interconnected grid with fixed frequency, the load moment of the electrical generator being set by the frequency converter.

6. The method according to claim 5, wherein the frequency converter comprises a converter at the generator side, an intermediate d.c. voltage circuit and a converter at the grid side, wherein the converter at the generator side and the converter at the grid side work independently of each other and the converter at the generator side sets the load moment at the electrical generator and the converter at the grid side stabilizes the voltage in the intermediate d.c. voltage circuit.

7. The method according to claim 6, wherein one forms the product of the intermediate circuit voltage and the load current in the intermediate d.c. voltage circuit to determine the output power of the electrical generator.

8. The method according to claim 5, wherein one forms the product of the generator moment and the generator speed by means of the converter at the generator side to determine the output power of the electrical generator.

9. The method according to claim 1, wherein the time-varying load moment has an oscillating load component.

10. The method according to claim 1, wherein, in a third operating range serving to activate the underwater power plant from standstill or idling operation, the water turbine is at first run up to speed in a startup phase and accelerated as far as the high-speed range before the transition to the first power-optimized operating range occurs.

11. The method according to claim 10, wherein, at the beginning of the startup phase, the water turbine is accelerated by means of the electrical generator in motor mode and upon passing a threshold value for the speed gradient the motor propulsion from the electrical generator ceases and the speed run-up is accomplished exclusively by the hydrodynamic moment taken up by the water turbine.

12. The method according to claim 11, wherein the startup phase is maintained for as long as it takes the speed gradient of the high-speed operation accomplished by the hydrodynamic moment to fall below a given minimum value, which is chosen such that the water turbine is brought close to the runaway speed.

13. The method according to claim 12, wherein the speed of the water turbine achieved at the end of the startup phase is used to determine a first estimated value for the power-optimal load moment.

14. The method according to claim 1, wherein the instance of a load moment chosen too high is diagnosed and then the load moment on the electrical generator is reduced abruptly.

15. The method according to claim 1, wherein the method in the first, power-optimized operating range shuts down the plant when the setpoint value of the load moment falls below a given minimum moment.

* * * * *